United States Patent
Soto

(10) Patent No.: US 11,147,243 B2
(45) Date of Patent: Oct. 19, 2021

(54) DOG COLLAR AND LEASH ASSEMBLY

(71) Applicant: Isaac Soto, Cypress, TX (US)

(72) Inventor: Isaac Soto, Cypress, TX (US)

(*) Notice: Subject to any disclaimer, the term of this patent is extended or adjusted under 35 U.S.C. 154(b) by 238 days.

(21) Appl. No.: 16/410,263

(22) Filed: May 13, 2019

(65) Prior Publication Data
US 2020/0359604 A1 Nov. 19, 2020

(51) Int. Cl.
A01K 27/00 (2006.01)

(52) U.S. Cl.
CPC .......... A01K 27/005 (2013.01); A01K 27/001 (2013.01); A01K 27/003 (2013.01)

(58) Field of Classification Search
CPC ... A01K 27/005; A01K 27/001; A01K 27/003
See application file for complete search history.

(56) References Cited

U.S. PATENT DOCUMENTS

| 2,799,245 | A | | 7/1957 | De Ruggiero | |
| 3,505,979 | A | * | 4/1970 | Rosswag | A01K 27/005 119/772 |
| 5,103,771 | A | * | 4/1992 | Lee | A01K 27/005 119/776 |
| 6,006,699 | A | * | 12/1999 | Keever | A01K 27/005 119/795 |
| 6,192,835 | B1 | | 2/2001 | Calhoun et al. | |
| 6,247,427 | B1 | * | 6/2001 | DeBien | A01K 27/005 119/776 |
| 6,499,437 | B1 | | 12/2002 | Sorensen et al. | |
| 6,629,511 | B2 | * | 10/2003 | De Bien | A01K 27/005 119/776 |
| 6,694,922 | B2 | | 2/2004 | Walter et al. | |
| 6,792,893 | B1 | | 9/2004 | Quintero et al. | |
| 7,162,978 | B2 | * | 1/2007 | Debien | A01K 27/005 119/772 |
| 7,640,639 | B2 | * | 1/2010 | de Bien | A01K 27/005 24/615 |
| 7,954,211 | B2 | * | 6/2011 | De Bien | A01K 27/005 24/606 |
| 8,151,737 | B1 | * | 4/2012 | Alonzo | A01K 27/003 119/799 |

(Continued)

FOREIGN PATENT DOCUMENTS

| DE | 9216023 U1 * | 1/1993 | ........... A01K 27/005 |
| WO | 2011064503 A1 | 6/2011 | |
| WO | 2014043297 A2 | 3/2014 | |

Primary Examiner — Kristen C Hayes
(74) Attorney, Agent, or Firm — Egbert, McDaniel & Swartz, PLLC

(57) ABSTRACT

A collar and leash system is provided which allows for easy connection of the collar with the leash without the pet owner having to bend down to attach or detach the collar leash. The collar has a first attachment member thereon which is received by a second attachment member on the leash. A solenoid position within the second attachment member operates to open and close the second attachment member so as to selectively release, accept, or retain the first attachment member of the collar. In an embodiment, the leash has a first portion which is flexible and a second portion adjacent the second attachment member which is rigid or semirigid. Preferably, a switch in the handle of the leash serves to operate the solenoid in the second attachment member.

14 Claims, 6 Drawing Sheets

(56) References Cited

U.S. PATENT DOCUMENTS

| | | | |
|---|---|---|---|
| 8,327,808 B2 | 12/2012 | Chirico | |
| 9,549,536 B2 * | 1/2017 | Soto | A01K 27/005 |
| 9,961,881 B2 * | 5/2018 | Granger | A01K 27/002 |
| 2004/0200435 A1 * | 10/2004 | Debien | A01K 27/005 |
| | | | 119/772 |
| 2006/0213455 A1 * | 9/2006 | Bien | A01K 27/005 |
| | | | 119/772 |
| 2009/0178627 A1 | 7/2009 | Bentz | |
| 2014/0000533 A1 | 1/2014 | Limberis | |
| 2016/0066545 A1 * | 3/2016 | DeBien | A01K 27/004 |
| | | | 119/796 |
| 2016/0249589 A1 * | 9/2016 | Soto | A01K 27/001 |
| | | | 119/794 |

* cited by examiner

DOG COLLAR AND LEASH ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of pet products. More particularly, the present invention relates to the field of dog collars and leashes. Even more particularly, the present invention relates to a dog collar and leash system of which is designed for use by individuals with back problems or pain.

2. Description of Related Art Including Information Disclosed Under 37 CFR 1.97 and 37 CFR 1.98

Many Americans are pet owners. In fact, recent statistics indicate that 62% of U.S. households own pets. These same statistics show that over $50 billion is spent annually on American pets, and a full 35% of American households owned one or more dogs.

Many dog owners (and some adventurous cat owners) spend a considerable amount of time walking their pets. While many dog owners walk their dogs one time per day, there are many dog owners who walk their dogs upward of three or four times daily. Professional dog walkers are also employed by many dog owners so that their dogs can get exercise during the time in which the dog owner is at work. The dog walk is critical for the physical and emotional health of a dog.

A standard dog leash is made of fabric material which is typically 5 to 6 feet long, depending on local ordinances requiring a maximum length. The leash has a handle on one thereof and attachment clip on opposite end thereof. The leash attachment clip must be secured on the D-ring located on the collar of the dog. This requires the dog owner to bend over to clip the leash clip on the D-ring of the collar on an often-excited dog. The same motion is required whenever the walk is over and the dog owner wishes to remove the leash from the collar of the dog.

Although most leashes and collars available on the market take a standard configuration, there have been many developments in the past related to advancements in leash and collar technology. For example, U.S. Pat. No. 2,799,245 (the '245 patent) issued on Jul. 16, 1957 to Ruggiero, describes a combination recoilable dog leash and collar. Referring generally to the figures, the dog leash and collar of the '245 patent is designed such that the leash is wound around and within the collar of the dog. In order to walk the dog, the dog owner would simply bend down and grasp the handle of the lease, pulling it outwardly from the collar of the dog.

In modern times, retractable leashes are very popular, allowing the dog to roam ahead or stay behind the dog walker a considerable distance. U.S. Pat. No. 6,694,922 (the '922 patent), issued on Feb. 24, 2004 to Walter et al., describes such a retractable leash assembly. The '922 patent describes a leash handle assembly having a housing with a grip portion, a spool assembly rotatably mounted in the housing, a trigger movably mounted to the grip portion, and a dual-position switch mounted to the housing proximate to the grip portion. The spool assembly is adapted for winding and unwinding a leash. The movable trigger is actuated to inhibit the leash from extending or retracting, and released to enable the leash to extend out of the housing in response to an external force. The spooling assembly is spring biased to cause the leash to retract in the absence of trigger actuation and the presence of a preset external force. The dual-position switch operates in a first position to lock the trigger in an actuated position and in a second position to enable the moveable trigger to operate freely. The dual-mode switch is positioned to enable a user to actuate it with the same hand that grasps the leash handle and actuates the movable trigger.

Other retractable leash developments have included multi-function leash assemblies. For example, U.S. Patent Publication No. 2014/0000533 (the '533 publication) published on Jan. 2, 2014 to Limberis et al., is one example showing a standard retractable leash having a handle and a retractable coiled leash line attached thereto. In the '533 publication, the inventors have added the function of one or more LED lights on the front end of the retractable leash assembly. In the '533 publication, one of the LED flashlights is pointed in the direction forward of the dog walker, while another is pointed towards the ground in front of the dog walker. Other specialized leash assemblies available on the market include those which have pet waste bag dispensers attached thereto.

U.S. Pat. No. 8,237,808, (the '808 patent), issued on Dec. 11, 2012 to Chirico. The '808 patent describes a universal or multipurpose dog leash. The leash can be configured to lead one dog or two dogs at the same time. The leash can be used as a hands free lead that is worn around the user's waist or shoulder. When worn around the waist, it allows 360 degrees of movement by the dog. The lead is also capable of being used as a seat restraint in a motor vehicle or as a tether. The leash is readily adjustable, suited for all size dogs, and can be especially useful for service dogs.

Other types of leash developments of included specialized leashes particularly suitable for pet owners who like to run with their dogs. U.S. Pat. No. 6,192,835 (the '835 patent), issued on Feb. 27, 2001 to Calhoon et al. The '835 patent describes a hands-free pet leash system wherein in lieu of a handle on the leash, the leashes attached to the user with a belt. Embodiments of a hands-free leash system are described, which include quick-connect/disconnect fasteners to attach a belt around a person's waist, the belt to a leash, and the leash to a collar adapter. The leash system also includes a second attachment point on the belt for attaching a second end of the leash to the belt, so that the leash may be stored on the belt when not in use on the pet, instead of dangling from the belt or from the user's hand. Both of the leash attachment points on the belt are assemblies that may slide independently along the length of the belt, so that the pet may maneuver around the user without tangling or twisting of the leash system.

Common to all the patents and patent publications described above the need for the dog owner to bend down to attach and detach the leash from the collar of the dog. Many Americans suffer from back problems and/or injury wherein it is difficult if not impossible for them to bend down to accomplish this task. While the owners may be able to walk, the back injury would prevent them from walking their dog. As noted hereinabove, walking the dog is critical for both the emotional and physical health of the dog. As such, an injured American is put into the difficult situation wherein he or she cannot adequately care for the pet. As such, a need has developed for a dog collar and leash which can be easily attached and detached from the pet.

In response to these problems, the present inventor developed a dog collar and leash which is the subject of U.S. Pat. No. 9,549,536 (hereinafter, the '536 patent), which issued on Jan. 24, 2017. Referring to FIG. 1, there is shown a side view of the collar and leash system 10 of the '536 patent. In FIG. 1, the leash is shown as being attached to the collar. FIG. 1 shows the collar 12. The collar 12 is a generally round piece of fabric as is standard in the art. The collar 12 has a counterweight 14 on one end thereof. Opposite the counterweight 14 is the first magnetic member 16 and the stem 18 which connects the first magnetic member 16 to the collar 12. Collectively, the first magnetic member 16 and stem 18 comprise the male attachment member 19 of the collar 12. The counterweight 14 serves to keep the collar in a position on the dog wherein the male attachment member 19 is pointing in an upward direction.

Also shown in FIG. 1 is the leash 20 of the collar and leash system 10. The leash 20 includes a hollow tubular member 22. A spool 24 is positioned at one end of hollow tubular member 22. A handle 26 is formed on the hollow tubular member 22 adjacent the spool 24. A brake member 28 is positioned adjacent the handle 26.

Opposite the spool 24, a female attachment assembly 30 is shown. The female attachment assembly 30 is suitable for attachment to the male attachment member 19 of the collar 12. Due to the rigid or semi-rigid nature of the hollow tubular member 22, it can be seen how the leash 20 can be attached to the collar 12 without the dog owner having to bend down to couple the two items together.

Referring to FIG. 2, there is shown a side view of the collar and leash system 10 of the '536 patent, wherein the female attachment assembly 30 of the leash 20 has been attached to the male attachment member 19 of the collar 12. As can be seen in FIG. 2, the leash is retractable. Lines 32 are shown as extending from the hollow tubular member 22 so as to attach the female attachment assembly 30. The lines 32 comprise a leash line and a release line. The lines 32 extend into the interior of the hollow tubular member 22 and are wound about the spool 24. The brake 28 can be used to disconnect the female attachment assembly 30 from the male attachment assembly 19.

FIG. 3 shows an isolated view of the female attachment assembly 30 of the '536 patent. FIG. 3 illustrates how the female attachment assembly 30 includes a bell-shaped housing 34 having an open end 35 on a bottom thereof. A first arm 36 and second arm 38 are shown as being in a position so as to leave the open end 35 of the bell-shaped housing 34 open enough for seat of a first magnetic member 16 of the male attachment member 19. FIG. 3 also shows how there is the first magnetic member 48 positioned within the bell-shaped housing 34.

The first arm 36 and second arm 38 are connected to leash line 42 and release line 44, respectively. Manipulation of the tensions in the respective leash line 42 and release line 44 cause the first arm and second arm 36 and 38 pivot about hinges so as to partially obstruct the opening to the bell-shaped housing 34 so as to secure the first magnetic member 16 of the male attachment assembly 19 therein.

During development of the dog collar and leash of the '536 patent, it was determined that application of a similar principle to a conventional fabric leash, as opposed to a retractable leash, was desired. In many cases, dog owners prefer the use of a conventional leash for easier control over their dogs and to prevent the dog from becoming entangled in the case of an overextended leash. Additionally, the present inventor attempted to simplify the components of the dog collar and leash assembly for manufacturing purposes. It was also desired during this process to ensure a secure connection between the collar and the leash.

These and other objects and advantages of the present invention will become apparent from a reading of the attached specification and appended claims.

BRIEF SUMMARY OF THE INVENTION

The present invention is an apparatus with a collar having a first attachment member and a leash assembly. The leash assembly includes a grip handle with a switch thereon, the switch connected to a battery. The leash line extends from the grip handle, and an electrical line extends from the switch of the grip and along a length of the leash line. The second attachment member of the leash assembly is adapted to couple with the first attachment member. The second attachment member has a solenoid position therein. The solenoid is connected to the electrical line, and the solenoid is operable to selectively open and close the second attachment member so as to selectively retain or release the first attachment member.

In the present invention, the second attachment member has preferably a housing with an open end and a pair of arms movable from a first position wherein at least a portion of the open end of the housing is obstructed, to a second position wherein the opening of the housing is unobstructed.

In an embodiment of the present invention, the pair of arms rotate inwardly when moving from the first position to the second position.

In an embodiment, the solenoid is affixed to a pair of linkages which are operatively connected to the pair of arms.

In an embodiment, the first attachment member has a first magnetic member thereon, and the second attachment member has a second magnetic member thereon.

In an embodiment of the present invention, the leash line includes a first portion adjacent the grip handle and a second portion adjacent the second attachment member, wherein the second portion has a greater rigidity than the first portion. Preferably, the second portion has a fiberglass rod core and a fabric surround. Preferably, the first portion is a fabric leash.

In an embodiment of the present invention, the leash assembly is a retractable leash assembly having a spool therein, wherein the leash line and the electrical line or co-wound on the spool. The leash assembly may have a hollow tubular member extending outwardly of the retractable leash assembly, wherein the leash line and the electrical line extend through the hollow tubular member.

The present invention is also a leash for a pet having a handle, a first portion extending from the handle and a second portion extending from the first portion of the opposite the handle. The second portion has a greater rigidity than the first portion. An attachment member is affixed to the second portion opposite the first portion.

In an embodiment, the first portion is an unreinforced flexible material, whereas the second portion is a reinforced flexible material. Preferably, the second portion has a fiberglass rod core with a fabric surround.

In an embodiment, the attachment member includes a housing with an open end, a magnet positioned within the open end, and a solenoid operable to open and close the open end of the housing. Preferably, the handle has switch thereon, the switch being electrically connected to the solenoid of the first attachment member.

In an embodiment, the first attachment member has a pair of arms operably connected to the solenoid which are movable from a first position wherein at least a portion of the open end is obstructed, to second position wherein the open end of the housing is unobstructed. Preferably, the pair of arms are rotatably inwardly when moved from the first position to the second position.

The present invention is also an apparatus including a collar with a first attachment member having a magnet thereon, and a leash assembly. The leash assembly includes a grip handle having a switch thereon which is connected to a battery, a leash line extending from the grip handle, an electrical line extending from the switch along the length of leash line, and a second attachment member adapted to coupled with the first attachment member. The second attachment member includes a housing with an open end, a magnet positioned within the open end, a solenoid positioned within the housing and connected to the electrical line, and a pair of arms operably connected to the solenoid. The pair of arms movable from a first position wherein at least a portion of the open end of the housing is obstructed to a second position wherein the open end of the housing is unobstructed.

In an embodiment, the pair of arms rotate inwardly when moving from the first position to the second position.

In an embodiment, the leash line includes a first flexible portion extending from the grip handle and a second reinforced portion extending between the first flexible portion in the second attachment member. The second reinforced portion has a higher rigidity than the first flexible portion.

This foregoing Section is intended to describe, in generality, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
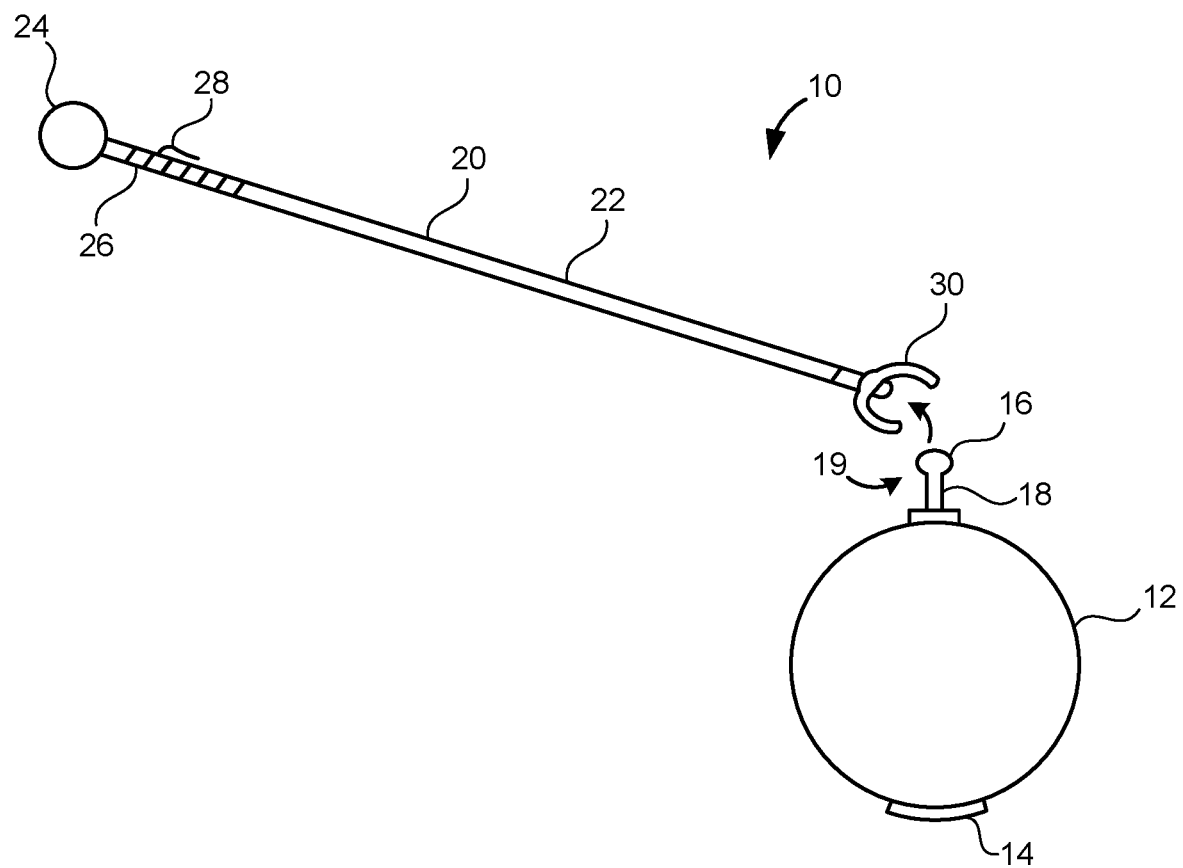
FIG. 1 is a side view showing the attachment of the collar and leash in the system of the '536 patent.
Figure 2:
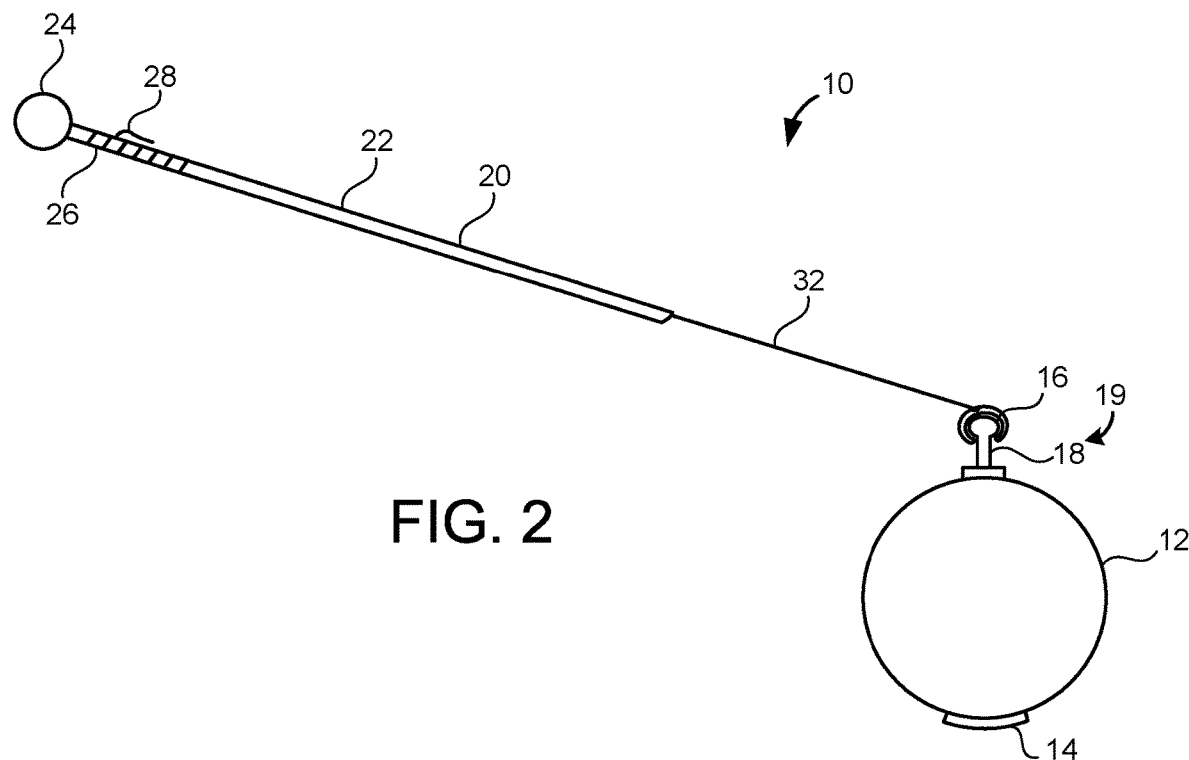
FIG. 2 is a side view showing the retractable nature of the leash in the system of the '536 patent.
Figure 3:
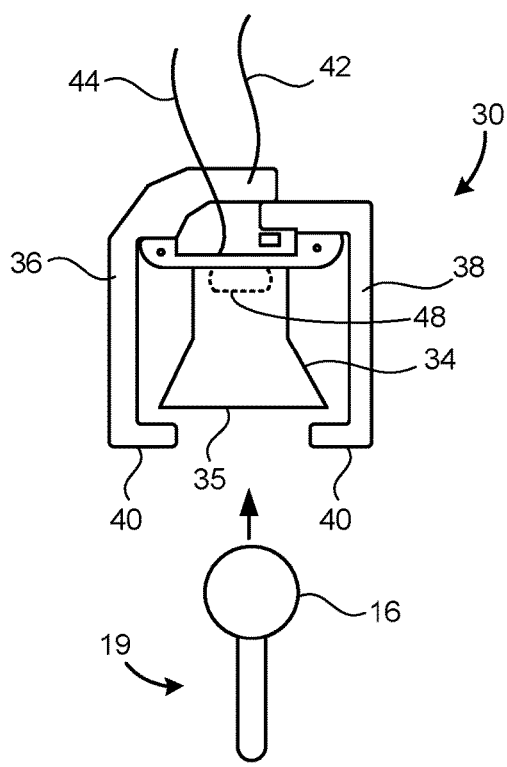
FIG. 3 illustrates the attachment assemblies of the '536 patent.
Figure 4:
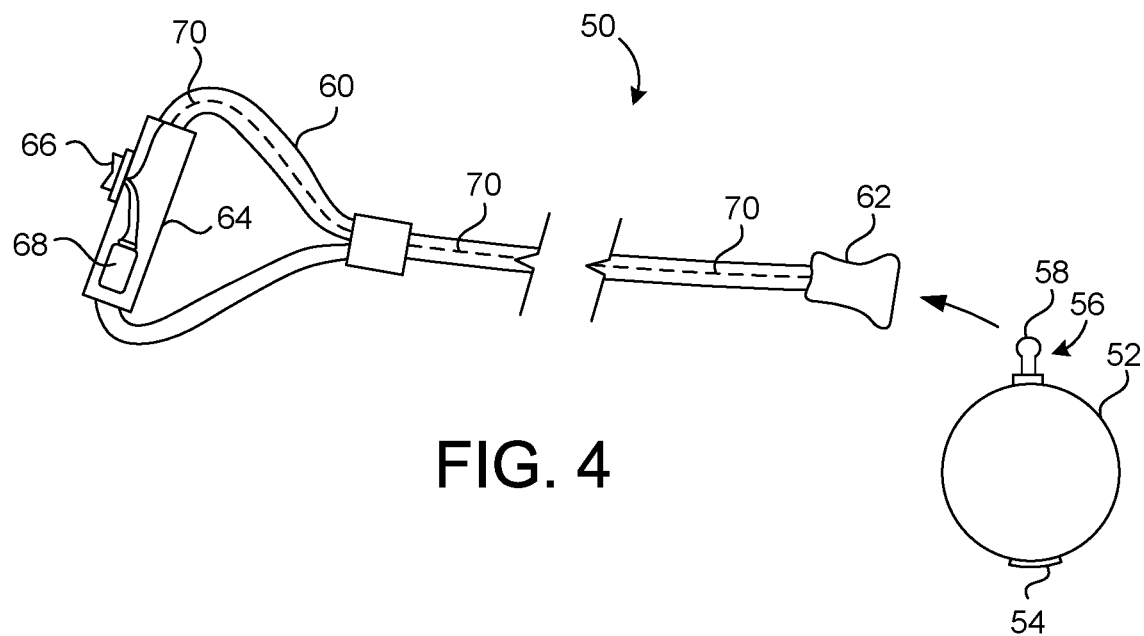
FIG. 4 is a side view, partially transparent, illustrating the collar and leash system of the preferred embodiment of the present invention.

Referring to FIG. 4, there is shown the collar and leash system 50 of the preferred embodiment of the present invention. In FIG. 4, it can be seen how the collar and leash system 50 includes a collar 52. The collar 52 preferably has a counterweight 54 on end thereof opposite the first attachment number 56. The first attached member 56, as was shown in the '536 patent, preferably includes a first magnetic member 58.

As used herein the term "magnetic member" can mean either of a permanent magnet, an electromagnetic, or a magnetic material. Importantly, it is necessary for the first magnetic member 16 to be attracted to the second magnetic member 48. It is also important for the screw 49 to be attracted to the second magnetic member 48 in the concept of the present invention.

The collar and leash system 50 also includes the leash 60. The leash 60 has a second attachment member 62 on an end thereof. The second attachment member 62 is engageable with the first attachment member 56. A grip handle 64 is shown opposite the second attachment member 62, while a leash or leash line 60 extends therebetween.

FIG. 4 illustrates the grip handle 64 in a transparent manner. As can be seen in FIG. 4, the grip handle 64 includes a switch 66 on outside thereof, with a battery 68 positioned therein. Preferably, the battery 68 is a nine volt battery. An electrical line 70 is shown extending between the switch 66 and battery 68. The electrical line 70 is shown in dashed lines extending through the leash line 60 so as to extend between the switch 66 and the second attachment member 62. As will be explained hereinbelow, the switch 66 is operable so as to selectively open and close the second attachment member 62 so as to receive, release or retain the first attachment number 56 therein.

As was the case with the '536 patent, when the user wants to attached the collar and leash system 50 of the present invention, he or she simply positions the second attachment member 62 adjacent the first attachment number 56. In the embodiment wherein magnets are present within and on the attachment members 56 and 62, the magnetic members will help guide the attachment members 56 and 62 to a coupled state. Preferably, the resting state of the second attachment member 62 is closed such that when the user wishes to couple or uncouple the collar and the leash, the switch 66 is used so as to open the second attachment member 62 to release or engage with the first attachment member 56. The use of the switch and battery system enables an easier coupling and uncoupling without having to manipulate various lines as was the case in the device of the '536 patent.

Preferably, the electrical line 70 extends through the center of the leash line 60. However, the electrical line 70 can also be wrapped on the exterior of the leash line 60.

Figure 5:
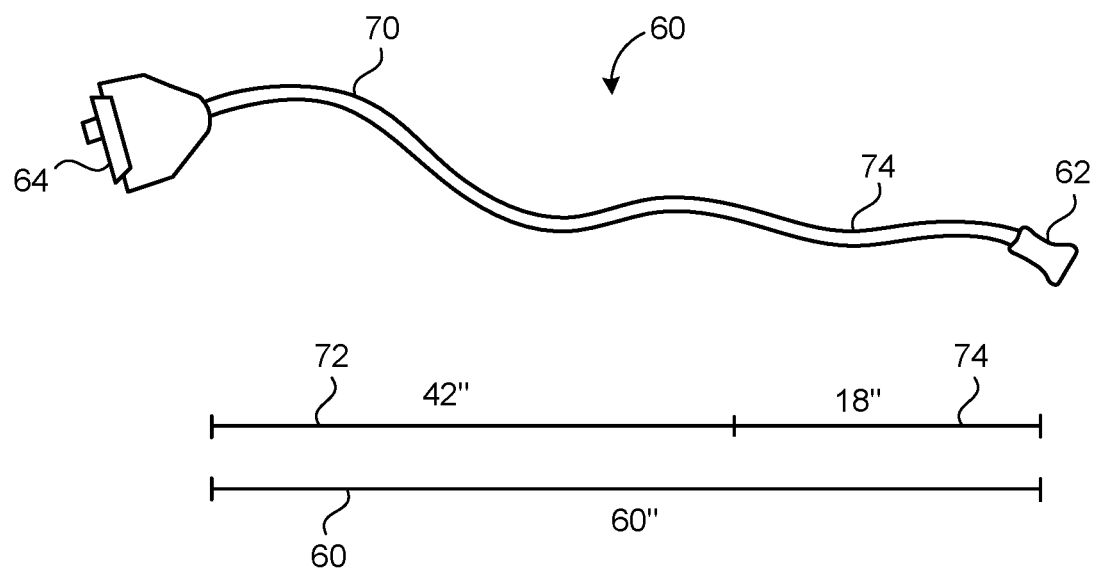
FIG. 5 schematic view illustrating the first portion and second portion of the leash of the system of the present invention.

Referring to FIG. 5, there is shown the preferred embodiment of the leash 60 of the present invention. The leash 60 of the present invention is a "hybrid leash", having a first portion 72 and a second portion 74. The first portion 72 is preferably flexible and unreinforced. For example, the first portion 72 could be a conventional rope or other fabric leash.

Figure 8:
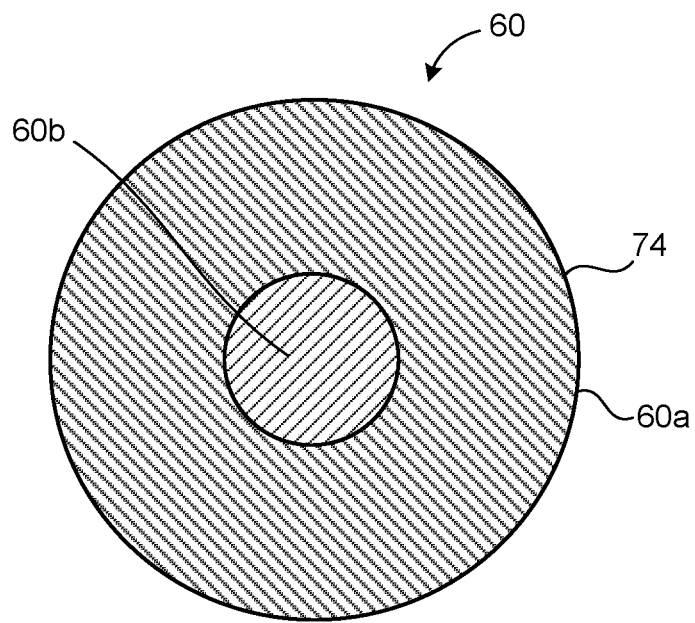
FIG. 8 is a cross-sectional view of the preferred embodiment of the second portion of the leash of the present invention.

The second portion 74 of the leash 60 has a higher rigidity than the first portion 72. Preferably, the second portion is rigid or semi-rigid, and may be a reinforced fabric leash. FIG. 8, for example, illustrates a cross-sectional view of a preferred embodiment of the second portion 74 of the leash 64. In FIG. 8, it can be seen how the second portion 74 includes a rigid or semi-rigid inner member 60b with a fabric or other flexible outer layer 60a. In the preferred embodiment, the rigid or semi-rigid inner member 60b is a fiberglass rod having a diameter of approximately ⅛ of an inch. The fiberglass rod is similar to a fishing pole, and serves to maintain some rigidity in the second portion 74.

Referring back to FIG. 5, it can be seen how the second portion 74 has a slight bend such that it is not entirely rigid. This rigid or semi-rigid second portion 74 allows for the user to position the second attachment member 62 adjacent the first attachment member 56 so as to couple or uncouple attachment members. The second portion 74 allows for the concept of the present invention to be utilized with a conventional leash without the hollow tubular member of the '536 patent.

FIG. 5 also illustrates the preferred length of the respective portions 72 and 74 of the leash 60. In FIG. 5, the leash 60 is illustrated as having a 60 inch length, whereas the first portion 72 measures 42 inches and the second portion 74 measures 18 inches. These lengths can vary, of course, but and an 18 inch length in the second portion 74 is generally suitable for the desired use of the second portion 74 while maintaining the features and flexibility of a conventional leash.

Figure 6B:
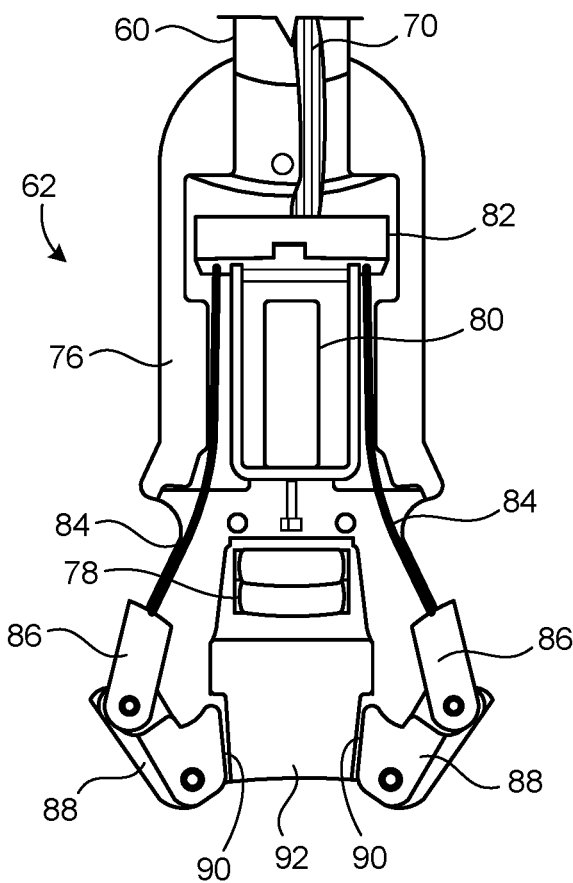
FIG. 6B is an isolated cross-sectional view of the second attachment number wherein the arms have been rotated so as to accept the male attachment member therein.
Figure 6A:
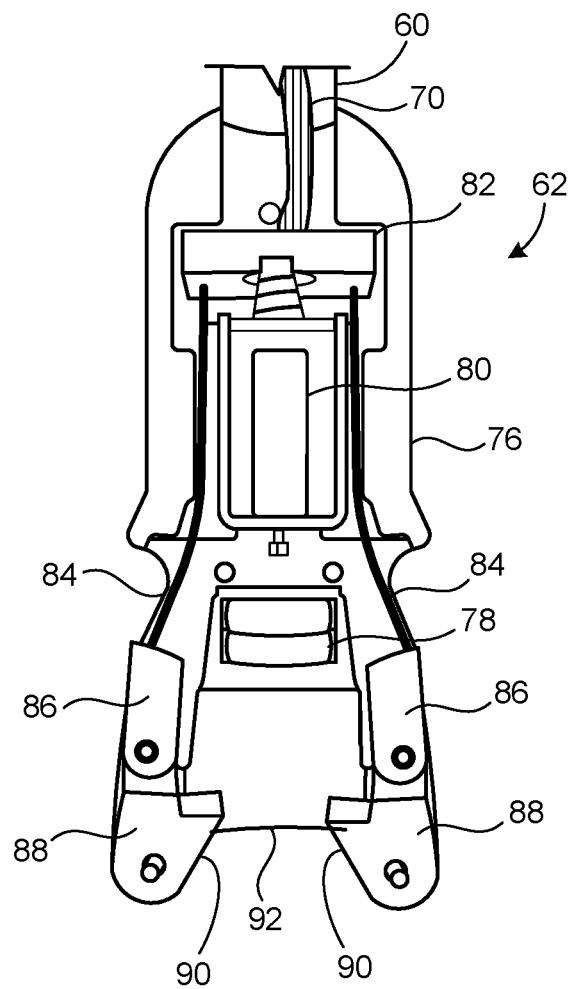
FIG. 6A is an isolated cross-sectional view of the second attachment member of the preferred embodiment of the present invention, wherein the arms obstruct the opening thereto.

FIGS. 6A and 6B illustrate the second attachment member 62 of the preferred embodiment of the present invention. FIG. 6A illustrates the second attachment member in a closed state. Referring to FIG. 6A, the second attachment member 62 has a housing 76. Preferably, the housing is bell-shaped. In an embodiment, the housing 76 includes a second magnetic member 78 therein. The second magnetic member 78 is used to help position the first magnetic member 58 of the first attachment member 56 therein. A solenoid 80 is shown as positioned centrally within the housing 76. The solenoid 80 is being connected to the electrical line 70. Introducing electrical current to the electrical line 70 by the switch 66 and battery 68 causes solenoid 80 to actuate. In a preferred embodiment, the actuation of the solenoid 80 moves a plunger 82, which is linked to the solenoid 80. The plunger 82 moves downwardly within the housing 76. Preferably, the plunger 82 is affixed to linkages 84. The linkages 84 are operably connected to the arms 88 at the opening 92 of the housing 76.

FIG. 6A illustrates the linkages 84 as being connected to pushing members 86. The pushing members 86 abut the arms 88. When the plunger 82 moves downwardly, the linkages 84 engage the pushing members 86 so as to rotate the arms 88 inwardly and upwardly, thus changing the opening 92 from partially obstructed to unobstructed so as to allow access for the first attachment member 56.

FIGS. 6A and 6B also illustrate that the arms 88 have angled ends 90 which serve to obstruct the opening 92 when in the closed position.

FIG. 6B illustrates the solenoid 80 in an actuated condition, wherein the plunger 82 is moved downwardly and the arms 88 have rotated inwardly and upwardly so as to expose the opening 92 of the housing 76. In FIG. 6B with the solenoid 80 actuated and the plunger 82 down, the arms 88 have rotated upwardly such that their edges generally line up with the diameter of the opening 92.

Once the first attachment member 56 is in position within the second attachment member 62, then the user simply releases the switch 66 so as to cause the arms 88 to rotate downwardly and outwardly so as to be positioned as in FIG. 6A.

Within the concept of the present invention other mechanisms are possible allowing the solenoid 82 operate on the arms 88. For example, rigid linkages 84 can be provided between the plunger in the arms 88 so as to act directly on the arms 88.

Figure 7:
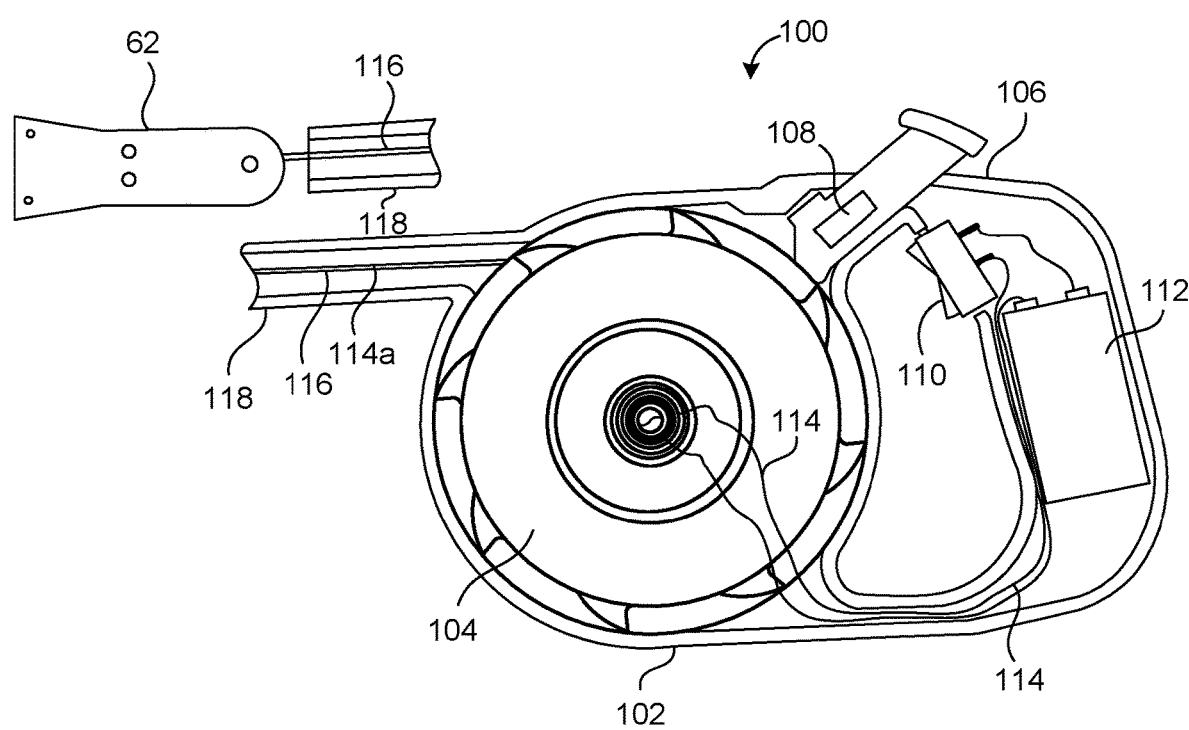
FIG. 7 is a schematic view illustrating the alternative embodiment of the present invention wherein a retractable leash assembly is provided.

Referring to FIG. 7, there is shown an alternative embodiment of the present invention wherein a retractable-type leash 100 is used with the second attachment member 62 of the present invention. The retractable leash 100 is used with the collar 52 as previously described, as well as the second attachment member 62 as previously described. FIG. 7 notably illustrates the exterior of the female attachment member 62.

FIG. 7 shows a retractable leash 100 as having a housing 102 with a spool 104 therein. The spool 104 is spring-loaded. A handle 106 is provided having a button 108 for retracting the leash thereon. The handle 106 comprises a housing for a switch 110, and a battery 112 within the housing. Electrical wiring 114 is illustrated as extending between the switch 110 and the battery 112 and to the center of the spool 104. Suitable brushes are provided at the center of the spool 104 so as to allow an electrical connection between the electrical wiring 114 extending from the switch 110 and battery 112 and the electrical wire 114a which is co-wound with the leash line 116.

Preferably, the retractable leash 100 of the present invention includes a rigid or semi-rigid hollow tubular member 118, which allows for connection of the second attachment member 62 with the first attachment member 56.

Figure 9:
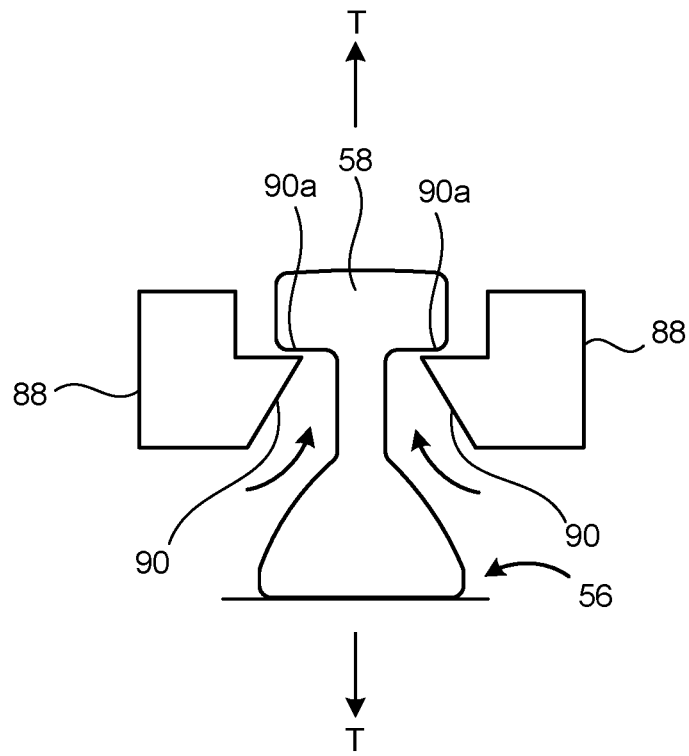
FIG. 9 illustrates an isolated view of the arms of the second attachment member securing the first attachment member therein.

FIG. 9 illustrates an important feature of the second attachment member 62 of the present invention, preventing accidental uncoupling of the attachment members 56 and 62. Referring to FIG. 9, the arms 88 of the second attachment member 62 are shown engaging the first attachment member 56. The first attachment member 56 is shown as having a first magnetic member 58.

The arms 88 engage the first attachment member 56 at surfaces 90a between the ends 90 of the arms 88 and the magnetic member 58 of the first attachment member 56. As noted before, when the solenoid is actuated, the arms 88 rotate inwardly and upwardly in the direction of the arrows shown so as to open the second attached member 62.

FIG. 9 illustrates a tension T between the attachment members 56 and 62, such as when a dog is pulling on the leash. As the solenoid 80 is relatively small in size and weak, this tension T prevents the solenoid 80 from actuating and moving the arms 88 upwardly and inwardly. Because the arms 88 of the second attachment over 62 can only rotate in an upward and inward direction, the collar and leash can only be disengaged when there is no tension on the leash. With no tension on the leash, the solenoid 80 is strong enough to rotate the arms inwardly and upwardly so as to release the attachment member 56.

The collar and leash system of the present invention allows for a quick and easy engagement and disengagement of a collar and leash for persons with disabilities or back problems or pain. Additionally, the collar and leash system allows for such quick and easy disengagement and engagement using a more standard leash, as well as the sometimes preferred retractable leashes. The collar and leash system of the present invention is both an easy to use, relatively easy to manufacture and most importantly, secure.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:
   a collar having a first attachment member; and
   a retractable leash assembly comprising:
      a grip handle having a switch thereon, said switch connected to a battery;
      a leash line extending from said grip handle;
      an electrical line extending from said switch of said grip handle along a length of said leash line;
      a spool, wherein said leash line and said electrical line are co-wound on said spool;
      a hollow tubular member extending outwardly of said retractable leash assembly, said leash line and said electrical line extending through said hollow tubular member; and
      a second attachment member adapted to couple with said first attachment member, said second attachment member having a solenoid positioned therein, said solenoid connected to said electrical line, said solenoid operable to selectively open and close said second attachment member so as to selectively retain or release said first attachment member.

2. The apparatus of claim 1, said second attachment member comprising:
   a housing having an open end; and
   a pair of arms movable from a first position wherein at least a portion of said open end of said housing is obstructed to a second position wherein said open end of said housing is unobstructed.

3. The apparatus of claim 2, wherein said pair of arms rotate inwardly when moving from said first position to said second position.

4. The apparatus of claim 2, said solenoid affixed to a pair of linkages, said pair of linkages operatively connected to said paid of arms.

5. The apparatus of claim 1, said first attachment member having a first magnetic member thereon, said second attachment member having a second magnetic member thereon.

6. A leash for a pet, the leash comprising:
   a handle;
   a first portion extending from said handle;
   a second portion extending from said first portion opposite said handle, said second portion having a greater rigidity than said first portion; and
   an attachment member affixed to said second portion opposite said first portion, said attachment member comprising:
      a housing having an open end;
      a magnet positioned within said open end of said housing; and
      a solenoid operable to open and close said open end of said housing.

7. The leash of claim 6, said first portion comprising an unreinforced flexible material, said second portion comprising a reinforced flexible material.

8. The apparatus of claim 7, said second portion comprising:
   a fiberglass rod core; and
   a fabric surround.

9. The apparatus of claim 6, said handle having a switch thereon, said switch electrically connected to said solenoid of said first attachment member.

10. The apparatus of claim 6, said attachment member having a pair of arms operably connected to said solenoid, said pair of arms movable from a first position wherein at least a portion of said open end of said housing is obstructed, to a second position wherein said open end of said housing is unobstructed.

11. The apparatus of claim 10, wherein said pair of arms rotatable inwardly when moved from said first position to said second position.

12. An apparatus comprising:
   a collar having a first attachment member with a magnet thereon; and
   a leash assembly comprising:
      a grip handle having a switch thereon, said switch connected to a battery;
      a leash line extending from said grip handle;
      an electrical line extending from said switch of said grip handle along a length of said leash line; and
      a second attachment member adapted to couple with said first attachment member, said second attachment member comprising:
         a housing having an open end;
         a magnet positioned within said open end of said housing;
         a solenoid positioned within said housing, said solenoid connected to said electrical line;
         a pair of arms operatively connected to said solenoid, said pair of arms movable from a first position wherein at least a portion of said open end of said housing is obstructed, to a second position wherein said open end of said housing is unobstructed.

13. The apparatus of claim 12, wherein said pair of arms rotate inwardly when moving from said first position to said second position.

14. The apparatus of claim 12, said leash line comprising:
   a first flexible portion extending from said grip handle; and
   a second reinforced portion extending between said first flexible portion and said second attachment member, said second reinforced portion having a higher rigidity than said first flexible portion.

* * * * *